US009018865B2

(12) United States Patent
Meyer, III et al.

(10) Patent No.: US 9,018,865 B2
(45) Date of Patent: Apr. 28, 2015

(54) PASSIVE HIGH-VOLTAGE DC BUS DISCHARGE CIRCUIT FOR A VEHICLE

(75) Inventors: John W. Meyer, III, Fishers, IN (US); David P. Tasky, Farmington Hills, MI (US); S. M. Nayeem Hasan, Novi, MI (US); Bryan M. Ludwig, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 13/460,011

(22) Filed: Apr. 30, 2012

(65) Prior Publication Data

US 2013/0285581 A1    Oct. 31, 2013

(51) Int. Cl.
| | |
|---|---|
| H02P 1/00 | (2006.01) |
| B60L 11/14 | (2006.01) |
| B60L 15/20 | (2006.01) |
| H01M 10/44 | (2006.01) |
| H02H 9/04 | (2006.01) |
| H02J 7/00 | (2006.01) |
| H01M 10/0525 | (2010.01) |

(52) U.S. Cl.
CPC ............... *H02J 7/0031* (2013.01); *B60L 11/14* (2013.01); *B60L 15/20* (2013.01); *B60L 2210/40* (2013.01); *B60L 2240/423* (2013.01); *B60L 2240/443* (2013.01); *B60L 2270/20* (2013.01); *H01M 10/0525* (2013.01); *H01M 10/44* (2013.01); *H01M 2220/20* (2013.01); *Y02T 10/642* (2013.01); *Y02T 10/70* (2013.01); *Y02T 10/7011* (2013.01); *Y02T 10/7077* (2013.01); *Y02T 10/7241* (2013.01); *Y02T 10/7275* (2013.01)

(58) Field of Classification Search
USPC .................................................. 318/507, 139
See application file for complete search history.

(56) References Cited

U.S. PATENT DOCUMENTS

| | | | | |
|---|---|---|---|---|
| 4,845,419 | A * | 7/1989 | Hacker ........................ | 320/136 |
| 6,960,899 | B2 * | 11/2005 | Kobayashi et al. ........... | 320/136 |
| 8,134,337 | B2 * | 3/2012 | Morita ......................... | 320/118 |
| 2004/0155629 | A1 * | 8/2004 | Kobayashi et al. ........... | 320/127 |
| 2004/0222767 | A1 | 11/2004 | Ohkouchi et al. | |
| 2008/0278117 | A1 * | 11/2008 | Tarchinski ................... | 320/135 |
| 2008/0319597 | A1 * | 12/2008 | Yamada ........................ | 701/22 |

(Continued)

FOREIGN PATENT DOCUMENTS

| | | |
|---|---|---|
| CN | 101544215 A | 9/2009 |
| CN | 202006766 U | 10/2011 |
| DE | 19508850 A1 | 9/1996 |
| JP | 2001218376 A * | 8/2001 |
| JP | 2010081703 A | 4/2010 |

*Primary Examiner* — Bentsu Ro
*Assistant Examiner* — Said Bouziane
(74) *Attorney, Agent, or Firm* — Quinn Law Group, PLLC

(57) ABSTRACT

A vehicle includes a rechargeable energy storage system (RESS), an electric traction motor, a traction power inverter module (TPIM), a high-voltage direct current (HVDC) bus that electrically connects the RESS to the TPIM, a passive discharge circuit connected across the positive and negative rails of the bus, and a microprocessor. The circuit includes a semiconductor switch. The microprocessor provides an output signal at a first voltage level that opens the switch and prevents discharge of the HVDC bus when the microprocessor is operating normally, and at a default second voltage level that closes the switch in the presence of a predetermined vehicle condition to thereby discharge the HVDC bus. An optocoupler may receive the output signal, and a zener diode may be in electrical parallel with an output side of the optocoupler. The switch may be an insulated gate bipolar transistor or a thyristor in different embodiments.

14 Claims, 2 Drawing Sheets

(56) References Cited

U.S. PATENT DOCUMENTS

2009/0268354 A1* 10/2009 Kaplan .................... 361/15
2010/0102638 A1* 4/2010 Chen et al. ................ 307/100
2010/0253287 A1* 10/2010 Kim et al. ................. 320/118
2011/0031939 A1* 2/2011 Funaba et al. ............. 320/166
2011/0057627 A1* 3/2011 Kuehner .................... 320/166
2012/0025769 A1* 2/2012 Kikuchi et al. ............ 320/118
2012/0098487 A1* 4/2012 Hooker et al. ............. 320/109

* cited by examiner

PASSIVE HIGH-VOLTAGE DC BUS DISCHARGE CIRCUIT FOR A VEHICLE

TECHNICAL FIELD

The present disclosure relates to a system and method for passively discharging a high-voltage DC bus in a vehicle.

BACKGROUND

Battery electric, extended-range electric, and hybrid electric vehicles use an electric traction motor to deliver torque to a transmission input member in what is commonly referred to as an electric vehicle (EV) mode. Electrical energy required for powering the traction motor is typically stored in a DC battery pack. A high-voltage direct current (HVDC) bus connects the battery pack to other high-voltage electrical components. Discharge of the HVDC bus is required at certain times. For instance, in some vehicles the HVDC bus must be discharged to a threshold safe state, e.g., below 60 VDC, within a calibrated duration of a key-off event, or when high-voltage contactors connecting a battery to the HVDC bus are opened. Conventional approaches for discharging an HVDC bus may be less than optimal in terms of component and/or energy costs.

SUMMARY

A vehicle is disclosed herein that improves on existing high-voltage DC (HVDC) discharge methods using a passive discharge circuit. In a particular embodiment, the vehicle includes a battery pack in the form of a rechargeable energy storage system (RESS), an electric traction motor, a high-voltage component such as a traction power inverter module (TPIM), an HVDC bus, the discharge circuit, and a microprocessor. The traction motor draws stored electrical energy from the RESS via the TPIM and outputs drive torque to a motor output shaft. The HVDC bus electrically connects the RESS to the high-voltage component.

The discharge circuit is electrically connected across the positive and negative rails of the HVDC bus, and includes a resistor and a semiconductor switch. The semiconductor switch is activated only during predetermined vehicle events, e.g., a key-off event, loss of software, an electrical fault, or a loss of control power (typically on the order of 12 VDC). The semiconductor switch may be embodied as an insulated gate bipolar transistor (IGBT), or alternatively as a thyristor. The microprocessor provides an output signal at a first voltage level that opens the semiconductor switch and thus prevents discharge of the HVDC bus whenever the microprocessor is operating normally, i.e., in the absence of the predetermined vehicle event. In the presence of the predetermined vehicle event, the microprocessor instead outputs a default second voltage level that closes the semiconductor switch. The closed switch discharges the HVDC bus through the resistor, e.g., a set of resistors connected in parallel or in series.

The present discharge circuit may include an optocoupler that receives the output signal from the microprocessor. A zener diode may be connected in electrical parallel with an output side of the optocoupler, with the zener diode acting as a voltage regulator at a switching gate of the semiconductor switch.

A passive discharge circuit for a vehicle having an HVDC bus is also disclosed. The discharge circuit includes a microprocessor and a semiconductor switch connected across the positive and negative rails of the HVDC bus. When the microprocessor is operating normally, the microprocessor provides an output signal at a first voltage level. The output signal in this instance opens the semiconductor switch and thereby prevents discharge of the HVDC bus. In the presence of a predetermined vehicle event the microprocessor instead provides the output signal at a default second voltage level. The output signal in this instance closes the semiconductor switch to thereby discharge the HVDC bus through a resistor of the discharge circuit.

Additionally, a method of discharging an HVDC bus as set forth herein includes electrically disconnecting an RESS from a TPIM, both of which are connected via the HVDC bus, in response to a predetermined vehicle event. The method includes transmitting an output signal from a microprocessor to a discharge circuit connected across positive and negative rails of the HVDC bus. The discharge circuit includes a semiconductor switch, which is either an IGBT or a thyristor. The method further includes closing the semiconductor switch in response to the output signal to thereby passively discharge the HVDC bus through a resistor.

The above features and advantages and other features and advantages of the present invention are readily apparent from the following detailed description of the best modes for carrying out the invention when taken in connection with the accompanying drawings.

DETAILED DESCRIPTION

Figure 1:
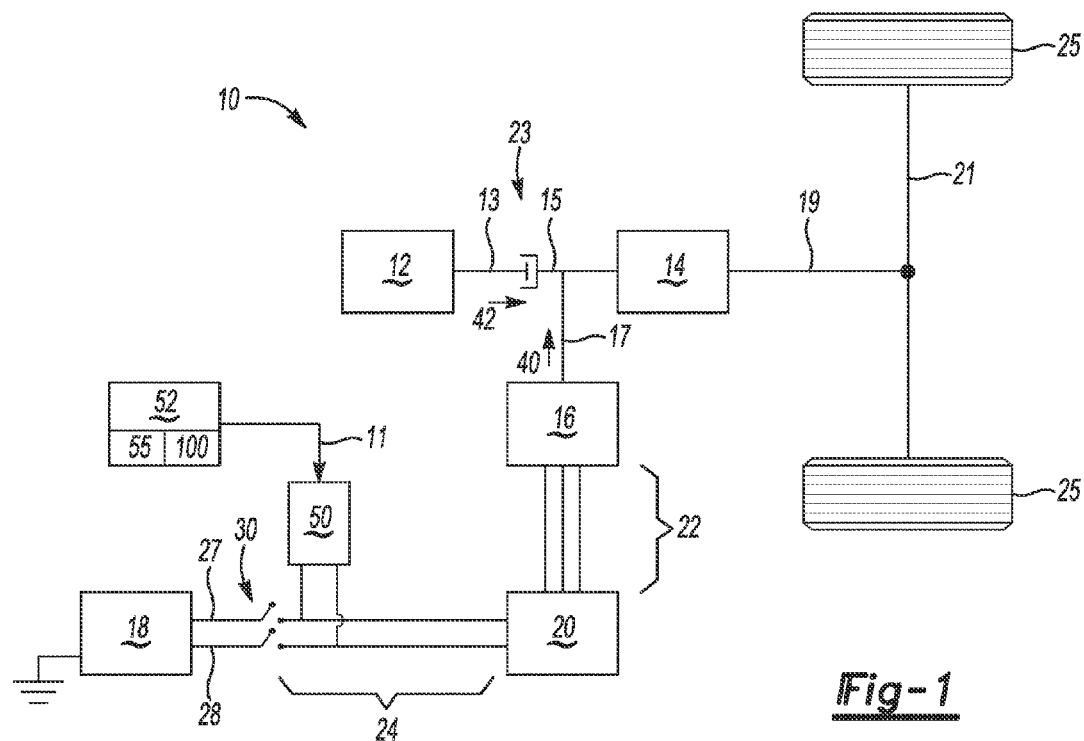
FIG. 1 is a schematic illustration of an example vehicle having a high-voltage DC (HVDC) bus and passive discharge circuit as disclosed herein.

Referring to the drawings, wherein like reference numbers correspond to like or similar components throughout the several figures, an example vehicle 10 is shown schematically in FIG. 1. In various embodiments, the vehicle 10 may be configured as a battery electric vehicle (BEV), an extended-range electric vehicle (EREV), a hybrid electric vehicle (HEV), or any other vehicle or other system having a high-voltage direct current (HVDC) bus 24 as described below.

As is well understood in the art, the vehicles 10 noted above are each powered at least some of the time solely using electrical energy from a high-voltage rechargeable energy storage system (RESS) 18, with such a mode referred to as electric vehicle or EV mode. The RESS 18 may be embodied as a multi-cell lithium ion or other suitable battery pack. The HVDC bus 24 may carry a DC voltage of about 60 VDC to 450 VDC or higher depending on the vehicle embodiment and/or operating mode. Thus, the term "high voltage" as used herein is taken relative to an auxiliary voltage, which is typically on the order of 12 VDC.

Discharge of the HVDC bus 24 to a threshold low-voltage state, for instance below 60 VDC, is required at times in response to certain vehicle events. Such events may include a key-off event, an electrical fault such as a short, a temporary loss of software to a hybrid controller 52, and/or any other fault in which 12 VDC auxiliary power is temporarily lost. To provide for such discharge in an energy efficient manner, the vehicle 10 of FIG. 1 includes a passive voltage discharge circuit 50 that is electrically connected across respective positive and negative rails 27 and 28 of the HVDC bus 24.

As described below with reference to FIGS. 2 and 3, the discharge circuit 50 of FIG. 1 is automatically disabled/turned off whenever a microprocessor 55 is on and fully operational. The microprocessor 55 may be part of the controller 52, or it may be a separate device. The microprocessor 55 in all embodiments provides an output signal (arrow 11) at a first level, e.g., 5 VDC, when the microprocessor 55 is operational. Likewise, the discharge circuit 50 is enabled/turned on when the microprocessor 55 is not operational, which occurs during the events noted above. In such a case, the output signal (arrow 11) is provided at a second level, e.g., 0 VDC. These output states may be represented logically as a binary 1 and 0 value, respectively.

The controller 52 of FIG. 1 may include one or multiple digital computers each having one or more microprocessors 55 and required memory, e.g., read only memory (ROM), random access memory (RAM), electrically-erasable programmable read only memory (EEPROM). The controller 52 may also include a high-speed clock, analog-to-digital (A/D) circuitry, digital-to-analog (D/A) circuitry, and any required input/output (I/O) circuitry and devices, as well as signal conditioning and buffering electronics. The controller 52 may be programmed with any required logic for executing the present method 100, an example of which is described below with reference to FIG. 4.

The vehicle 10 of FIG. 1 may include at least one multi-phase electric traction motor 16. The traction motor 16 provides motor output torque (arrow 40) via a motor output shaft 17 to an input member 15 of a transmission 14. The RESS 18 is connected to at least one high-voltage component, such as a traction power inverter module (TPIM) 20. When the traction motor 16 is a multi-phase AC machine, the RESS 18 provides electrical energy to the traction motor 16 via the TPIM 20 over an alternating current (AC) bus 22. In turn, the TPIM 20 of such an embodiment is electrically connected to the RESS 18 via the HVDC bus 24.

When the vehicle 10 of FIG. 1 is configured as an HEV, an internal combustion engine 12 may be used to selectively generate engine torque (arrow 42) via a crankshaft 13. The crankshaft 13 may be selectively connected to the input member 15 of the transmission 14 using an input clutch 23. An output member 19 of the transmission 14 ultimately transmits transmission output torque to a drive axle 21, and thus to a set of road wheels 25.

Contactors 30 may be opened by the controller 52 to selectively disconnect the RESS 18 from the TPIM 20. The TPIM 20 in turn is configured to convert AC power from the traction motor 16 to DC power suitable for storage in the RESS 18, and vice versa. As is known in the art, a DC-DC power converter (not shown), also referred to as an auxiliary power module, may be used to increase or decrease the level of DC power to a level suitable for use by various DC-powered vehicle systems, e.g., a 12 VDC auxiliary power system, auxiliary battery, etc.

Various active discharge approaches may be used to discharge a voltage. Two example approaches are the use of pulse-width modulation to modulate a voltage level across a discharge resistor, and the use of a passive resistor that is continuously connected across the rails of a high-voltage bus to continuously discharge power. Relative to these active switching and continuous discharge approaches, the present discharge circuit 50 shown in FIG. 1 may provide advantages in terms of reduced hardware components and/or associated energy costs. Two example embodiments for the discharge circuit 50 will now be described with reference to FIGS. 2 and 3.

Figure 2:
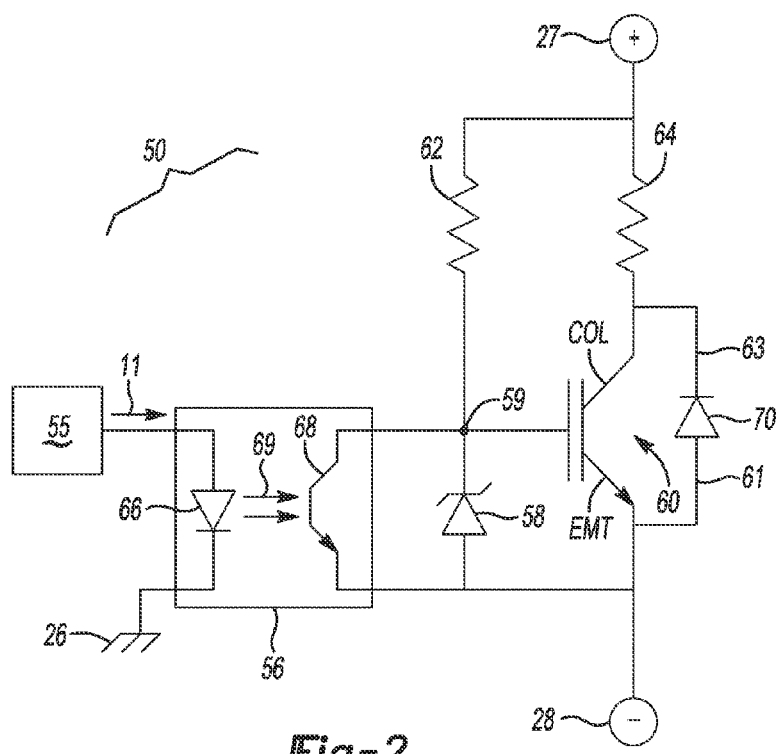
FIG. 2 is a schematic illustration of an example passive voltage discharge circuit that may be used with the vehicle shown in FIG. 1.

Referring to FIG. 2, the discharge circuit 50 may be electrically connected across the positive (+) rail 27 and the negative (−) rail 28 of the HVDC bus 24 shown in FIG. 1. The microprocessor 55 provides the output signal (arrow 11) to an optical isolator or optocoupler 56. The optocoupler 56 includes a photodiode 66 and a suitable photodetector, for instance a transistor 68. The photodiode 66 is connected between the microprocessor 55 and ground 26, e.g., the chassis of the vehicle 10 shown in FIG. 1. As is well understood in the art, an optocoupler is an electronic device that transfers an electronic signal between circuit components, here the photodiode 66 and transistor 68, using a relatively short and electrically isolated optical transmission channel. Thus, the example optocoupler 56 of FIGS. 2 and 3 transfers electrical signals to the transistor 68 via light waves (arrows 69) emitted from the photodiode 66. The output side of the optocoupler 56 is connected in electrical parallel with a zener diode 58. The zener diode 58 acts as a voltage regulator within the discharge circuit 50.

A semiconductor switch 60 includes a switching gate 59. The voltage at the switching gate 59 drives the semiconductor switch 60, and thus the zener diode 58 may be used to hold the semiconductor switch 60 closed when the discharge circuit 50 is activated. In the example embodiment of FIG. 2, the semiconductor switch 60 is an insulated gate bipolar resistor (IGBT). The emitter (EMT) of the semiconductor switch 60 is connected to the negative rail 28 and may be connected to an anode 61 of a diode 70. The collector (COL) of the semiconductor switch 60 is connected to a resistor 64 and may be connected to the cathode 63 of the diode 70. The resistor 62 acts as a current limiting resistor, which in a particular embodiment may have a resistance value that is approximately 5 to 10 times greater than the resistance value of the resistor 64. The resistor 64 should be sized to discharge the HV bus 24 in a calibrated amount of time. Likewise, in all embodiments the resistor 62 should be sized large enough to turn on the gate of the semiconductor switch 60 in a calibrated amount of time. To achieve the required resistance level, the resistor 64 may be optionally formed by connecting multiple resistors in series or parallel with each other.

The semiconductor switch 60 of FIG. 2 is in a "default on" state when the microprocessor 55 is off. This default state may be referred to as a binary 0 state, or alternatively a 0 VDC state. The default state is held by the zener diode 58 after voltage from the optocoupler 56, e.g., a 5 VDC voltage, is discontinued. The optocoupler 56 is inactive when the microprocessor 55 is off. As a result, a voltage drop is present between the switching gate 59 and the negative rail 28. The presence of a threshold voltage at the switching gate 59 drives the semiconductor switch 60. Electrical current can thus pass through the semiconductor switch 60. As a result, voltage dissipates across the resistor 64.

The other state of the discharge circuit 50 of FIG. 2 occurs when the microprocessor 55 is up and running properly and determines, as explained below with reference to FIG. 4, that a discharge of the HVDC bus 24 of FIG. 1 is not required. In this instance the microprocessor 55 provides an output signal (arrow 11) to the optocoupler 56 at a second level. This state may be referred to as a binary 1 state, or alternatively a 5 VDC state. The voltage at the switching gate 59 is negligible when the optocoupler 56 is on. As a result, the semiconductor switch 60 turns off. Depending on the embodiment, the output signal (arrow 11) may also be buffered or amplified to properly drive the optocoupler 56. Also, although not shown in FIG. 2 for illustrative simplicity, the output signal (arrow 11) may be current limited in some embodiments prior to the optocoupler 56, for instance by adding a resistor.

Using the discharge circuit 50 of FIG. 2, passive discharge of the HVDC bus 24 of FIG. 1 is automatically enabled when needed, and automatically disabled during normal driving modes of the vehicle 10 of FIG. 1. In this manner, system losses may be minimized while improving overall fuel economy relative to the conventional active or passive dissipation methods noted above.

Figure 3:
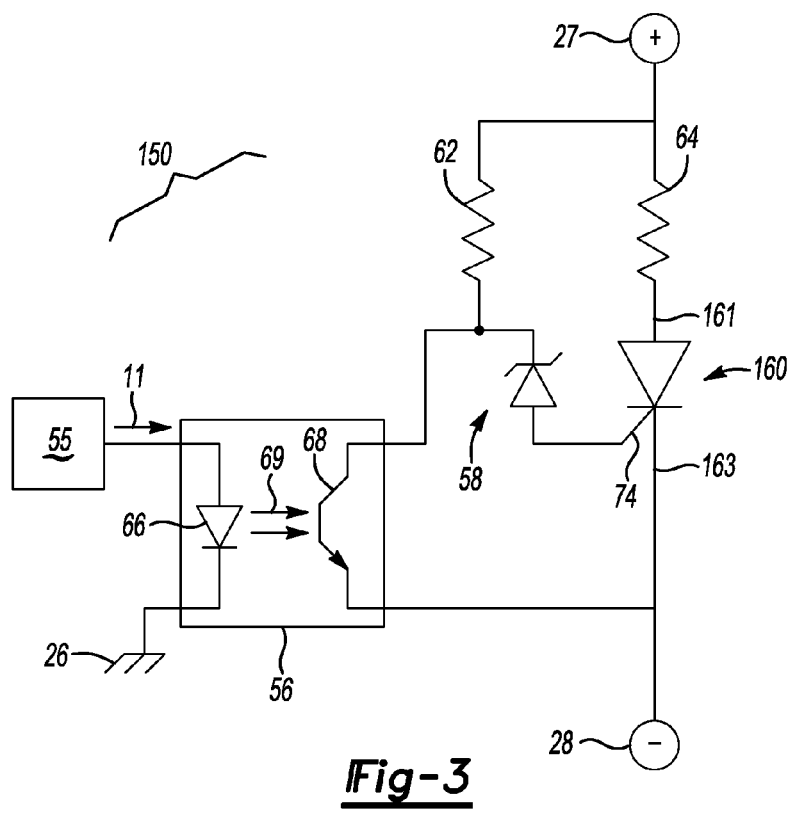
FIG. 3 is a schematic illustration of an alternative passive voltage discharge circuit embodiment that may be used with the vehicle shown FIG. 1.

Referring to FIG. 3, in another embodiment the semiconductor switch 60 of FIG. 2 may be replaced with a thyristor to provide an alternative semiconductor switch 160. As is understood in the art, a thyristor or silicon-controlled rectifier (SCR) is a multi-layered solid-state device having alternating n-type and p-type materials. Such a device may be used to control electrical current, and thus may be used in lieu of the IGBT approach of FIG. 2. The thyristor includes a cathode 161 connected to the resistor 64, an anode 163 connected to the negative rail 28, and a gate 74 connected in series with the zener diode 58 described above.

Once the semiconductor switch 160 of FIG. 3 has been switched on by a voltage at the switching gate 59, as described above with reference to FIG. 2, the switch 160 remains latched in an on state. As with the embodiment of FIG. 2, a 5 VDC voltage is not provided from the optocoupler 56 when the microprocessor 55 is off. While the microprocessor 55 is off, the semiconductor switch 160 is on, and the voltage in the HVDC bus 24 can dissipate across the resistor 64. In this embodiment the microprocessor 55 must be operational and sending a first voltage to the optocoupler 56 before closing of the contactors 30 to prevent discharge. The zener diode 58 helps hold the semiconductor switch 160 off in this condition.

Figure 4:
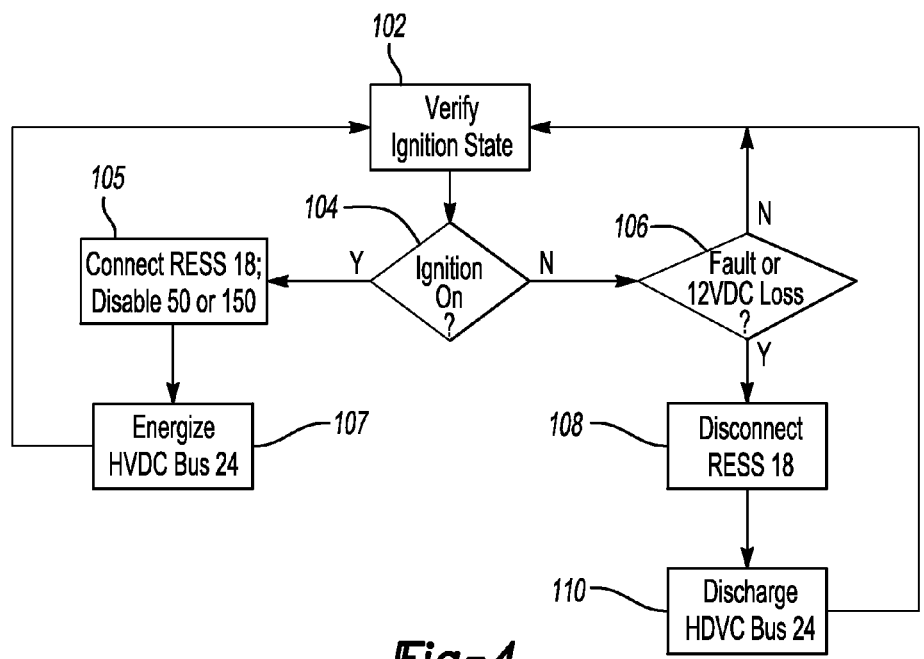
FIG. 4 is a flow chart describing an example method for passively discharging voltage from the HVDC bus of the vehicle shown in FIG. 1.

Referring to FIG. 4 in conjunction with FIG. 1, a method 100 for passively discharging the HVDC bus 24 of FIG. 1 begins at step 102, wherein a vehicle ignition state is verified. For instance, step 102 may include verifying the ignition on/off state for the vehicle 10 of FIG. 1 such as by detecting the voltage level at an ignition switch.

At step 104, the method 100 includes determining whether the condition of step 102 is true, in which case the method 100 proceeds to step 105. If the condition of step 102 is false, e.g., the ignition is off, the method 100 proceeds instead to step 106.

At step 105, the controller 52, or in particular the microprocessor 55 therein, is turned on. Any required HV contactors 30 are closed. In other words, the RESS 18 is electrically connected to the TPIM 20. As part of step 105, the output signal (arrow 11) may be transmitted at a first level to disable the discharge circuit 50 or 150, with the first level being a binary 1 or 5 VDC signal. The method 100 then proceeds to step 107.

At step 106, other vehicle conditions may be evaluated, such as whether any fault occurs that would require dissipation, or whether a loss of 12 VDC auxiliary power is experienced. If any of these conditions are present, the method 100 proceeds to step 108. Otherwise, the method 100 is finished, and starts anew with step 102.

At step 107, the HVDC bus 24 is energized. The state of the semiconductor switch 60 or 160 prevents discharge of the HVDC bus 24. The method 100 then repeats step 102 to ensure that the initial ignition state determined at step 102 remains active.

At step 108, the microprocessor 55 is turned off. Any required HV contactors 30 are opened. In other words, the RESS 18 of FIG. 1 is electrically disconnected from the TPIM 20. The output signal (arrow 11) may be transmitted to the discharge circuit 50, 150 at a second level, with the second level being a binary 0 or 0 VDC signal.

At step 110, the HVDC bus 24 is passively discharged by operation of the resistors 62, 64 and one of the semiconductor switch 60 or 160 as described above. The method 100 is then finished, commencing anew with step 102.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a rechargeable energy storage system (RESS);
an electric traction motor having an output shaft, wherein the traction motor draws energy from the RESS and outputs drive torque to the output shaft to propel the vehicle;
a high-voltage component;
a high-voltage direct current (HVDC) bus that electrically connects the RESS to the high-voltage component, wherein the HVDC bus includes a positive rail and a negative rail;
a passive discharge circuit that is electrically connected across the positive and negative rails, wherein the passive discharge circuit includes:
an optocoupler having a photodiode;
a zener diode in electrical parallel with the optocoupler;
a diode having an anode and a cathode;
a discharge resistor connected to the positive rail and to the cathode of the diode;
a semiconductor switch with a switching gate, a collector, and an emitter, wherein the discharge resistor is connected to the positive rail and to the collector of the semiconductor switch, the emitter is connected to the anode of the diode, and the cathode of the diode is connected between the collector and the discharge resistor; and
a microprocessor in electrical communication with the passive discharge circuit wherein the photodiode of the optocoupler is connected between the processor and electrical ground;
wherein the microprocessor provides an output signal at a first voltage level of 5VDC to the optocoupler that opens the semiconductor switch and prevents discharge of the HVDC bus across the discharge resistor when the microprocessor is operating normally, and at a default second voltage level of 0VDC to the optocoupler that closes the semiconductor switch, which is held closed via the zener diode, to activate the passive discharge circuit only in the presence of a predetermined vehicle condition to thereby passively discharge the HVDC bus across the discharge resistor, and wherein the predetermined vehicle condition is a condition in which a 12VDC auxiliary voltage is temporarily lost aboard the vehicle.

2. The vehicle of claim 1, wherein the electric traction motor is a multi-phase alternating current (AC) electric machine, and wherein the high-voltage component is a fraction power inverter module configured to convert AC voltage from the electric traction motor to a DC voltage suitable for storage in the RESS.

3. The vehicle of claim 1, wherein the HVDC bus has a normal, non-discharged voltage range of at least 60VDC.

4. The vehicle of claim 1, wherein the semiconductor switch is an insulated gate bipolar transistor (IGBT).

5. The vehicle of claim 1, wherein the semiconductor switch is a thyristor.

6. The vehicle of claim 1, wherein the passive discharge circuit further includes a current limiting resistor connected to the positive rail and to the switching gate and having a resistance of between 5 and 10 times a resistance of the passive resistor.

7. A discharge system for a vehicle having a high-voltage direct current (HVDC) bus with a positive rail and a negative rail, the system comprising:
 a passive discharge circuit having a discharge resistor, an optocoupler having a photodiode, a zener diode in electrical parallel with the optocoupler, a diode having an anode and a cathode, a discharge resistor connected to the positive rail and to the cathode of the diode, and a semiconductor switch in electrical series with the discharge resistor, wherein the discharge circuit is connected across positive and negative rails of the HVDC bus and the semiconductor switch includes a switching gate, a collector, and an emitter, and wherein the discharge resistor is connected to the positive rail and to the collector of the semiconductor switch, the emitter is connected to the anode of the diode, and the cathode of the diode is connected between the collector and the discharge resistor; and
 a microprocessor configured to provide an output signal to the passive discharge circuit via the optocoupler at a first voltage level above 0VDC and up to 5VDC, wherein the first voltage level opens the semiconductor switch and prevents discharge of the HVDC bus across the discharge resistor, and at a default second voltage level of 0VDC only during a predetermined vehicle event, wherein the second voltage level closes the semiconductor switch to thereby activate the passive discharge circuit and thereby passively discharge the HVDC bus across the discharge resistor;
 wherein the HVDC bus electrically connects a rechargeable energy storage system (RESS) to a high-voltage component of the vehicle.

8. The discharge system of claim 7, wherein the predetermined vehicle condition is selected from the group consisting of: a key-off event and a fault condition in which a 12VDC auxiliary voltage to the microprocessor is temporarily lost.

9. The discharge system of claim 7, wherein the semiconductor switch is an insulated gate bipolar transistor (IGBT).

10. The discharge system of claim 7, wherein the semiconductor switch is a thyristor.

11. The discharge system of claim 7, wherein the passive discharge circuit further includes a current limiting resistor connected to the positive rail and to the switching gate and having a resistance of between 5 and 10 times a resistance of the passive resistor.

12. A method for discharging a high-voltage DC (HVDC) bus of a vehicle having a rechargeable energy storage system (RESS) and a traction power inverter module (TPIM) that is electrically connected to the RESS, the method comprising:
 electrically disconnecting the RESS from the TPIM by opening contactors in response to a predetermined vehicle event in which a 12VDC auxiliary voltage is temporarily lost aboard the vehicle;
 transmitting an output signal of 0VDC via a microprocessor to a passive discharge circuit that is connected across positive and negative rails of the HVDC bus only in response to the vehicle event, wherein the passive discharge circuit includes:
  an optocoupler having a photodiode;
  a zener diode in electrical parallel with the optocoupler;
  a diode having an anode and a cathode;
  a discharge resistor connected to the positive rail and the cathode of the diode;
  a semiconductor switch with a switching gate, a collector, and an emitter, wherein the discharge resistor is connected to the positive rail and to the collector of the semiconductor switch, the emitter is connected to the anode of the diode, and the cathode of the diode is connected between the collector and the discharge resistor; a semiconductor switch configured as one of an insulated gate bipolar transistor (IGBT), and a thyristor; and
 closing the semiconductor switch in response to the output signal of 0VDC to thereby discontinue transmission of light waves from the photo diode of the optocoupler to the zener diode; and
 providing a voltage drop between the switching gate and the negative rail in response to the closing of the semiconductor switch to allow current to pass through the semiconductor switch and to passively discharge the HVDC bus across the discharge resistor of the discharge circuit.

13. The method of claim 12, further comprising:
 electrically connecting the RESS to the TPIM by closing the contactors when the predetermined vehicle event is no longer present; and
 transmitting an output signal to the discharge circuit at a voltage level of 5VDC to thereby open the semiconductor switch and prevent discharge of the HVDC bus across the discharge resistor.

14. The method of claim 12, wherein the passive discharge circuit further includes a current limiting resistor connected to the positive rail and to the switching gate and having a resistance of between 5 and 10 times a resistance of the passive resistor, and wherein providing a voltage drop between the switching gate and the negative rail in response to the closing of the semiconductor switch includes allowing current to pass through the current limiting resistor of the discharge circuit.

* * * * *